F. A. CUSHMAN. 2 Sheets—Sheet 1.

Assignor to W. A. RUSSELL.

Wood-Grinders for Paper-Pulp.

No. 8,198. Reissued April 23, 1878.

WITNESSES

Wm A Skinkle

Robordeau Buchanan.

INVENTOR

Francis A Cushman

By his Attorneys

Baldwin Hopkins & Peyton

F. A. CUSHMAN. 2 Sheets—Sheet 2.

Assignor to W. A. RUSSELL.

Wood-Grinders for Paper-Pulp.

No. 8,198. Reissued April 23, 1878.

*WITNESSES*

Wm A Skinkle

Roberdeau Buchanan.

*INVENTOR*

*Francis A Cushman*

*By his Attorneys*

Baldwin Hopkins & Peyton

UNITED STATES PATENT OFFICE.

FRANCIS A. CUSHMAN, OF LEBANON, NEW HAMPSHIRE, ASSIGNOR TO WILLIAM A. RUSSELL.

IMPROVEMENT IN WOOD-GRINDERS FOR PAPER-PULP.

Specification forming part of Letters Patent No. 153,190, dated July 21, 1874; Reissue No. 8,198, dated April 23, 1878; application filed March 29, 1878.

*To all whom it may concern:*

Be it known that I, FRANCIS A. CUSHMAN, of Lebanon, Grafton county, New Hampshire, have invented a new and useful Improvement in the Art of Reducing Wood to Pulp, and also certain new combinations of machinery, by means of which said improvement in the art may be worked out; and that the following, taken in connection with the drawings, is a full, clear, and exact description thereof.

Figure 1:
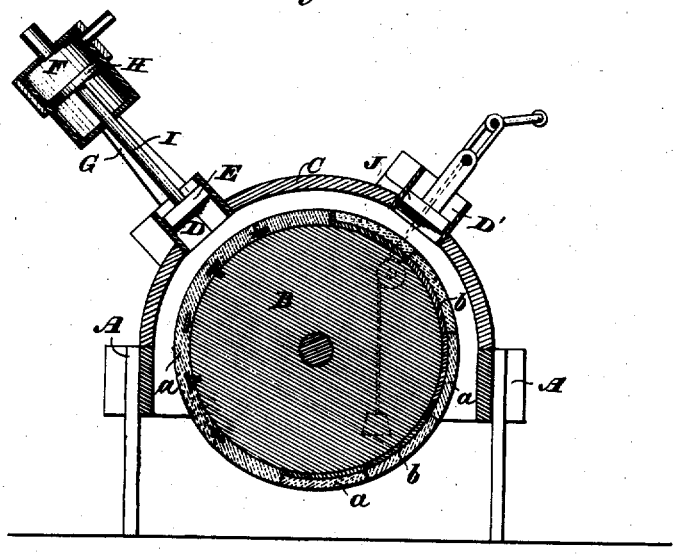
Figure 2:
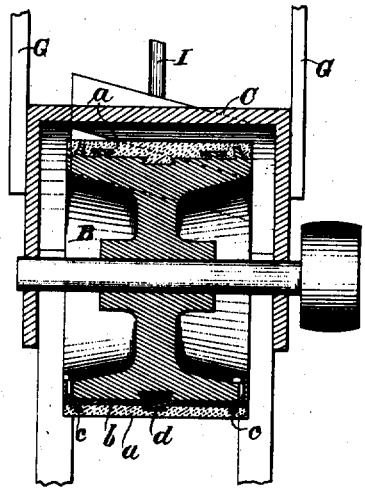
Figure 3:
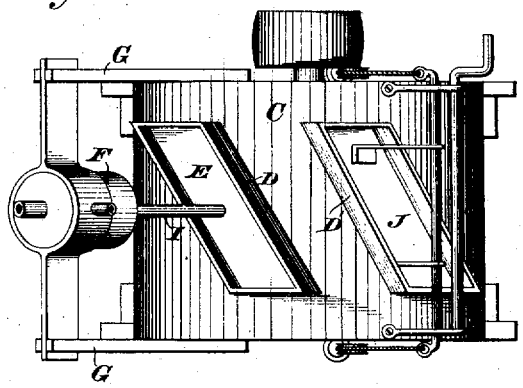
Figure 4:
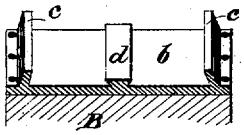
Figure 5:
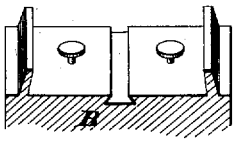
Figure 6:
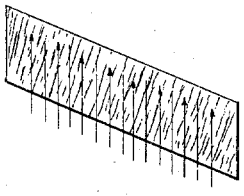

In the drawings, Figure 1 is a vertical section through certain apparatus by means of which my improvement in the art may be worked out. Fig. 2 is an elevation of the same, taken at right angles to that of Fig. 1. Fig. 3 is a plan of the same. Figs. 4 and 5 are perspective views of details, and Fig. 6 is a sketch illustrating the improvement in the art.

Prior to the date of my invention wood had been submitted to the action of grinding-surfaces, in order to reduce it to pulp, with the grain in various relations to the surface and to the line of motion thereof. The best known ways of presenting the fibers of the wood to the surface are those of Christian Voelter, who presented the ends of the fibers to the grinding-surface so that the surface acted to cut or break the fibers in planes perpendicular to their length; of Brooman, who submitted blocks of wood to the action of a grinding-surface in such manner that the grain or fibers were not in the same plane or curve as that of the surface, but inclined thereto at various angles, depending upon the size of the grindstone and the length of the block; and of Henry Voelter, who so presented the blocks to the grinding-surface that the fibers lay substantially in the plane or curve of the grinding-surface, and were acted upon by the asperities of the grinding-surface in lines substantially perpendicular to the length of the fibers, so that the fibers were, as it were, rolled out of the block.

This latter was, so far as I know, the preferred way of defibering wood prior to my invention, as it produces long fibers and a given quantity of fiber with a comparatively small expenditure of power. The difficulty with this plan is that the fibers are rolled out too easily, and consequently are, when rolled out, too far removed from ultimate fiber—in fact, often composed of bundles of fibers, and are also too little broomed up or bruised to felt to the best advantage.

Henry Voelter's feed-boxes were arranged, with reference to the grinding-surface, with the intention of so holding the blocks of wood that the asperities of the surface would, as before stated, act upon the fibers in lines perpendicular to the length thereof, and it was his intention that the asperities should act substantially in such lines.

Now I have discovered that finer fibers, fibers more regular in length and thickness, and fibers more near to ultimate fiber, and more broomed up, can be produced by submitting the wood to the grinding-surface with its fibers substantially in the curve or plane of the grinding-surface; or, in other words, with the whole fiber resting on the grinding-surface, so that the whole of each fiber is substantially exposed to the action of the grinding-surface, and at the same time in such manner that the asperities of the grinding-surface move diagonally across the fibers, thereby partly rolling and partly pulling the fibers out of the block of wood.

I have devised machinery by means of which this improvement in the art may be carried out, but desire it to be understood that this improvement may be worked out by other forms of grinding-surface than that represented in the drawings. The machine represented in the drawings is of the class that employs a revolving stone or rasping-cylinder, which, when revolved like a grindstone, defibers the wood in the manner before described.

In the drawings, a strong frame is represented at A, supporting the shaft on which the stone or grinding-wheel B is secured. C is a hood or cover partially inclosing the wheel and supporting the hoppers or feed-boxes. D D′ are hoppers or feed-boxes supported by the hood, in which the blocks of wood to be ground are placed.

Plungers or followers for forcing the blocks of wood upon the grinding-surface are represented at E J, the latter actuated, as feed-plungers sometimes are, by weights, and the former, E, by a piston-rod, I, moved by a piston, H, lying within a cylinder, F, which piston is to be forced down by pressure exerted by a column of water in a pipe, or by water forced into the cylinder by a pump; and this pressure may be regulated by suitable appliances. The hydraulic piston is supported by the uprights G G.

In the Henry Voelter machine, before referred to, the feed-boxes were arranged in such wise that their sides were parallel with the axis of the grindstone, and, as the grain of the wood lay parallel with these sides, the asperities of the stone moved in lines perpendicular to the length of the fibers.

I prefer to arrange the feed-boxes so that their sides (see the drawings) are diagonal to the lines of motion of the asperities of the grinding-surface, are inclined to planes passing through the axis of the stone, and inclined to planes which bound the sides of the stone, instead of perpendicular to the line of motion of the asperities of the grinding-surface, and to planes bounding the sides of the stone, as in Henry Voelter's machine. When blocks split and sawed from a tree-trunk or sawed from a beam are placed in these boxes, they are to be so placed that the fibers to be acted upon lie substantially in the surface of the stone, or in curves parallel with that surface, but are inclined in their length to the direction or line of motion of the asperities of the stone, (see Fig. 6,) so that these asperities attack the sides of the fibers not in lines perpendicular to their length, but in lines which are diagonal to the length of the fiber, thereby partly rolling out and partly pulling out the fibers.

In order that the wood may be reduced to pulp, water is supplied in any usual way.

The grinding-wheel represented in the drawings is constructed as follows: First, a strong pulley or cylinder, B, is keyed upon a shaft, and upon the periphery of this pulley are screwed segmental plates of metal, *b*, provided with inclined flanges *c c* on their peripheries, near the edges thereof, and with a dovetailed rib, *d*, between the flanges. Outside of the flanges are bolt-holes, through which screws may pass to attach the segments to the pulley. This construction is represented at Fig. 4, and an alternative construction is so clearly represented in Fig. 5 that it needs no further description.

Before or after these segments are bolted to the pulley they are covered with a layer of grinding material, *a*, in a plastic state, said material being well known, and consisting chiefly of emery, corundum, quartz, or other suitable substance. This material is held in place by the inclination of the flanges and the dovetailed rib *d*, and may be applied by means of a proper mold, and when applied constitutes a proper cylindrical grinding-surface.

In the operation of this machine the wood is placed in the hoppers, the stone or grinding-wheel is put in revolution, and the wood is pressed upon the grinding-surface either by weight or by the hydraulic cylinder, its piston, and piston-rod; and when the blocks of wood are placed in the hoppers or feed-boxes in such manner that the fibers thereof are supported in the boxes with their lengths in lines diagonal to the line of motion of the asperities of the grinding-surface, then the wood is defibered or reduced to pulp in the improved manner hereinbefore set forth.

When wood is reduced to pulp by asperities of a grinding-surface acting upon fibers thereof in the manner described, more power is required, so far as I can ascertain, to reduce a given quantity of wood to pulp than is required by proceeding according to Henry Voelter's method; but this increased expenditure of power is more than compensated by the superior quality of the pulp.

I do not claim an apparatus for feeding blocks of wood to be ground which is actuated by compressed air or gas, as such apparatus differs radically in its mode of operation from my own, as the elasticity of the air or gas would tend to cause a spring or jumping action in feeding, and it would be very difficult, practically, to prevent the escape of the air or gas from the cylinder under the pressure to which it is necessarily subjected, whereas, by the use of water, I obtain a pressure as solid as if the water were a stick or rod of iron; and, with a pump or a water-column, the pressure is easily applied and maintained, as slight leaks would do no special harm, especially if the hydraulic cylinder were supplied by a column of water from the reservoir which drives the water-wheels.

I claim as of my own invention—

1. The herein-described improvement in the art of reducing wood to pulp, said improvement consisting in defibering a block by a grinding-surface the asperities of which act upon the fibers in lines diagonal to their length, when said fibers are held, substantially as described, with reference to the grinding-surface.

2. In combination with a stone or grinding-wheel, and with a plunger or follower to force the wood in contact with the wheel, a hopper or feed-box arranged with its sides diagonal to the line of motion of the asperities of the grinding-surface, the combination being and acting substantially as described.

3. A grinding-wheel composed of a central pulley of metallic segments, provided with inclined flanges and dovetails, and of a composition applied to the segments, the whole being substantially such as set forth.

4. In combination with a feed-box and plunger, a hydraulic cylinder and piston apparatus, substantially such as described, for filling said cylinder with water under pressure, whereby wood supported in the feed-boxes is forced against a grinding-surface by the action of the water, substantially as described.

FRANCIS A. CUSHMAN.

Witnesses:

JABEZ S. HOLMES,
J. HENRY TAYLOR.